(12) United States Patent
Lanter et al.

(10) Patent No.: US 11,587,159 B2
(45) Date of Patent: Feb. 21, 2023

(54) BRIDGE APPLICATION FOR USER PIN SELECTION

(71) Applicant: CPI Card Group—Tennessee, Inc., Nashville, TN (US)

(72) Inventors: Alec Warren Lanter, Murfreesboro, TN (US); Erik Ronald Stell, Brentwood, TN (US)

(73) Assignee: CPI CARD GROUP—TENNESSEE, INC., Nashville, TN (US)

( * ) Notice: Subject to any disclaimer, the term of this patent is extended or adjusted under 35 U.S.C. 154(b) by 30 days.

(21) Appl. No.: 16/087,960

(22) PCT Filed: Apr. 20, 2018

(86) PCT No.: PCT/US2018/028559
§ 371 (c)(1),
(2) Date: Sep. 24, 2018

(87) PCT Pub. No.: WO2018/200327
PCT Pub. Date: Nov. 1, 2018

(65) Prior Publication Data
US 2020/0202422 A1 Jun. 25, 2020

Related U.S. Application Data

(60) Provisional application No. 62/489,085, filed on Apr. 24, 2017.

(51) Int. Cl.
*G06Q 40/02* (2012.01)
*G06F 3/12* (2006.01)
(Continued)

(52) U.S. Cl.
CPC ........... *G06Q 40/02* (2013.01); *G06F 3/1204* (2013.01); *G06F 3/1254* (2013.01); *G06Q 10/10* (2013.01);
(Continued)

(58) Field of Classification Search
CPC .... G06Q 40/02; G06Q 10/10; G06Q 2220/00; G06F 3/1204; G06F 3/1254;
(Continued)

(56) References Cited

U.S. PATENT DOCUMENTS

| 5,132,521 A | 7/1992 | Smith |
| 2007/0124238 A1 | 5/2007 | Hogg |

(Continued)

FOREIGN PATENT DOCUMENTS

WO   WO-2015107346 A1 * 7/2015 ......... G06Q 20/4012

OTHER PUBLICATIONS

CU Answers. "Instant Card Issue for Atm/Debit Cards and Credit Cards." Retrieved from <http://www.cuanswers.com/wp-content-uploads/InstantCardIssue.pdf> Mar 19, 2017.

*Primary Examiner* — Techane Gergiso
(74) *Attorney, Agent, or Firm* — Dorsey & Whitney LLP

(57) ABSTRACT

Systems and methods related to a bridge application that facilitates interoperability between a remotely-served application and locally connected peripheral devices. The bridge application may execute on a local machine and be addressable at the loop-back address of the local machine. Requests issued to the bridge application may be verified as originating from a trusted source. In turn, requests from a locally performed and remotely-served application may be issued to local hardware resources such as peripheral devices or the like.

41 Claims, 4 Drawing Sheets

(51) Int. Cl.
  *G06Q 10/10* (2012.01)
  *G07F 7/10* (2006.01)
  *H04L 9/08* (2006.01)
  *H04L 9/32* (2006.01)
  *H04L 29/06* (2006.01)
  *H04L 9/40* (2022.01)

(52) U.S. Cl.
  CPC .......... *G07F 7/1025* (2013.01); *H04L 9/0863* (2013.01); *H04L 9/3226* (2013.01); *H04L 63/0428* (2013.01); *G06F 3/1284* (2013.01); *G06Q 2220/00* (2013.01)

(58) Field of Classification Search
  CPC ... G06F 3/1284; G07F 7/1025; H04L 9/0863; H04L 9/3226; H04L 63/0428
  See application file for complete search history.

(56) References Cited

U.S. PATENT DOCUMENTS

| | | |
|---|---|---|
| 2012/0016797 A1 | 1/2012 | Smith |
| 2014/0123236 A1* | 5/2014 | Hirata ................. H04L 63/0807 726/4 |
| 2014/0166748 A1 | 6/2014 | Graves |
| 2015/0052253 A1* | 2/2015 | Johnson .............. H04L 61/3045 709/226 |
| 2015/0199673 A1* | 7/2015 | Savolainen ........ G06Q 20/3278 705/71 |
| 2016/0087933 A1* | 3/2016 | Johnson ............ H04W 12/0023 709/245 |
| 2017/0142111 A1* | 5/2017 | Ezell ....................... H04L 67/02 |
| 2018/0114223 A1* | 4/2018 | Dellostritto ........ G06Q 30/0633 |

\* cited by examiner

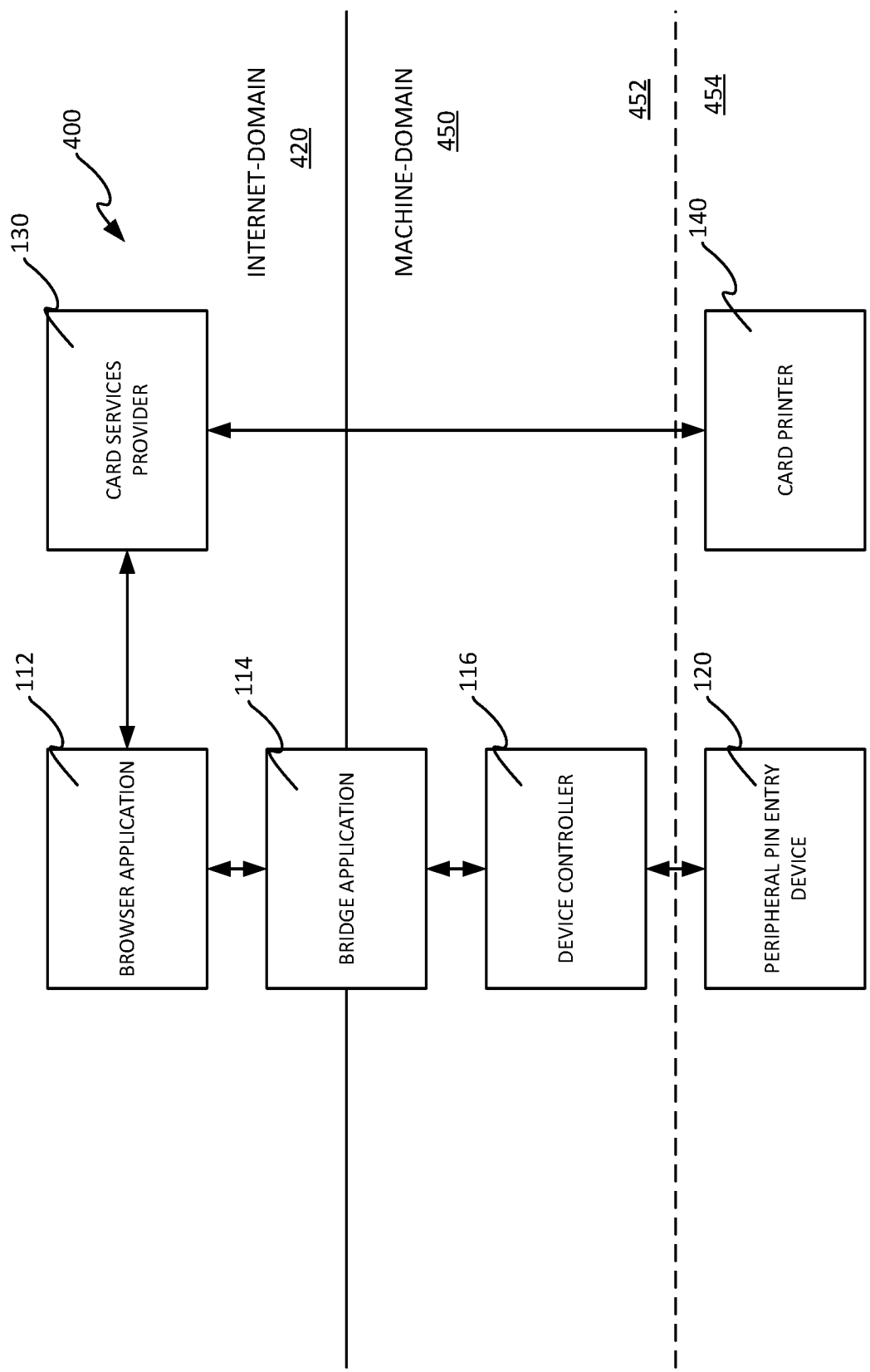

BRIDGE APPLICATION FOR USER PIN SELECTION

RELATED APPLICATIONS

This application a U.S. National Stage Application under 37 U.S.C. 371 to PCT Patent Application No. PCT/US18/028559, filed Apr. 20, 2018, entitled "BRIDGE APPLICATION FOR USER PIN SELECTION", which claims benefit of priority to U.S. Provisional Patent Application No. 62/489,085, filed Apr. 24, 2017, entitled "BRIDGE APPLICATION FOR USER PIN SELECTION", the entirety of which is incorporated herein by reference.

FIELD

The present disclosure relates to financial card issuance, and in particular to utilities (e.g., software, hardware, firmware, and combinations thereof) configured to assist in instant issuance of a financial card.

BACKGROUND

Advances in financial card issuance tools provided by card services providers have provided increased flexibility and convenience in the issuance of a financial card to a customer. Traditional card issuance involves personalization of a financial card remotely from a user, typically by a card services provider. In turn, a card may be delivered to the user by mail. Such mailing may result in delay in the user receiving the card and may potentially implicate security vulnerabilities associated with the mailing of the card to the user. As such, "instant issuance" solutions have been developed that provide for assistance in issuance of a card in the presence of a user at the user's location. For example, such instant issuance solutions may allow for personalization of a card while a user waits in a branch bank location or the like. In turn, a user may request or apply for a financial card and receive that card in a relative short time period, all while remaining at the same location.

Given the large number of potential locations at which instant issuance solutions may be implemented, efforts have been made to make instant issuance solutions efficient and easy to implement. For instance, instance issuance solutions may be implemented using software-as-a-service (SaaS). In these implementations, the instant issuance solution may be served to a remote location using a web service or the like. In turn, a branch bank office or other location implementing the instant issuance solution may employ commonly available and standard computing resources such as a browser application for implementation of certain portions of an instant issuance solution. Such remotely-served, SaaS applications provide increased flexibility and efficiency for implementation of an instant issuance solution, however, continued challenges in relation to operability and security remain.

SUMMARY

The present disclosure relates to utilities that facilitate improved operability and enhanced security in connection with a remotely-served instant card issuance application that is at least partially performed at a local machine in a location at which a card is to be issued to a customer. The present disclosure may specifically provide a solution that allows operability between a local machine and a remotely-served instant card issuance to allow a local peripheral device in operative communication with the local machine to be utilized in connection with the instant card issuance application through bridged interaction between the local peripheral device and the instant card issuance application by way of a bridge application. In a specific application, the present disclosure facilitates bridged communication between a remotely-served instant card issuance application that is at least partially performed at a local machine and a peripheral personal identification number (PIN) entry device operatively connected to the local machine. A peripheral PIN entry device may allow a customer to securely provide a customer-specified PIN for use in relation to personalization of the card to be issued to the customer.

In turn, a peripheral PIN entry device that is operatively connected to a local machine may be used in connection with an instant card issuance application that is at least partially performed at the local machine. As may be readily appreciated, a PIN comprises sensitive data that should be maintained securely. A peripheral PIN entry device may assist in providing security in relation to the customer-specified PIN. Specifically, the peripheral PIN entry device may comprise a hardware security module (HSM) that may be used to generate PIN data that is encrypted to provide security in relation to a customer-specified PIN. PIN entry devices are often provided as a peripheral device to be operatively connected to a local machine to allow for control over the PIN entry device in relation to processing and encryption key management for security purposes.

Remotely-served applications have traditionally relied on native browser functionalities and interfaces to facilitate direct interaction with peripheral devices. For instance, instant card issuance applications have been built as rich Internet applications that may include client-side scripting to provide direct interaction with local machine resources much like a traditional locally executed application. Examples of platforms that allowed client-side scripting delivered remotely from a local machine to interact with hardware of a local machine included Adobe® Flash®, JavaFX, Microsoft® Silverlight®, or use of ActiveX controls. Specifically, these platforms relied on native browser functionalities or plug-in based browser capabilities to allow direct interaction with local machine hardware drivers and the like. However, allowing remotely served scripts to be executed on a local machine has resulted in challenges associated with platform interoperability, plug-in updating requirements, and security concerns among other issues. In response, most popular and widely used browsers have eliminated support for direct control of local machine hardware resources using the above-related native browser functionalities, plug-ins, or other controls based on client-side scripting provided by remote entities. As such, an Internet-centric challenge is presented regarding the ability to utilize peripheral devices at a local device in connection with performance of an application that is remotely-served to the local machine via the Internet.

In turn, the present disclosure provides a solution to address the Internet-centric challenges described above while offering enhanced operability and security. Specifically, the present disclosure relates to a bridge application that may execute on a local machine to provide bridged interaction between a remotely-served instant card issuance application that is performed on a local machine (e.g., in a browser application executing on the local machine) and a peripheral device interconnected to a local machine (e.g., a peripheral PIN entry device). A browser application or other Internet-connected application at the local machine may receive a remotely-served instant card issuance application.

The remotely-served instant card issuance application may comprise instructions that trigger the browser application to generate a PIN request that may be in the form of Internet protocol messaging that is directed to the bridge application at the loopback address of the local machine. For instance, the browser application may be triggered to generate a PIN request based on a condition or option in the instant card issuance application associated with a user selection to provide a customer-specified PIN for use in connection with the card to be issued to the customer.

As noted above, the bridge application that executes locally on the local machine, may receive a PIN request comprising Internet protocol messages from the browser application that are addressed to the loopback address based on instructions of the remotely-served instant card issuance application being performed on the local machine (e.g., by a browser application). For instance, the PIN request may be communicated to the bridge application using the TCP/IP protocol in the form of hypertext transfer protocol (HTTP) messages. In this regard, an instant card issuance application may include instructions that cause the browser application to generate an appropriate PIN request addressed to the bridge application on the loopback address of the local machine so that the PIN request may be processed by the bridge application. Accordingly, a specific configuration of a remotely-served instant card issuance application may be provided to properly address PIN requests to the bridge application.

As noted above, such a PIN request issued to the bridge application based on instructions of the instant card issuance card may be addressed to a loopback address that is monitored by the bridge application executing on the local machine to facilitate delivery of the PIN request from the instant card issuance application to the bridge application. The PIN request may be subject to a number of security protocols provided by the bridge application. For instance, the bridge application may only accept a PIN request that has been addressed by an instant card issuance application executed at the local machine such that a PIN request addressed to the loopback address is delivered to the bridge application also executing on the local machine. In turn, a PIN request originating externally to the local machine may not be processed by the bridge application by virtue of not being addressed to the loopback address of the local machine. In one regard, a PIN request addressed to an address other than the loopback address may not be delivered to the bridge application (i.e., the bridge application may only be delivered PIN requests via the loopback address). Additionally or alternatively, the bridge application may be configured to disregard any PIN requests the bridge application may receive that are not addressed to the loopback address (e.g., such as a PIN request addressed to an IP of the local machine as exposed to an externally facing network or the like).

In addition, the bridge application may be operative to identify a source of the PIN request. As the instant card issuance application may cause the PIN request to be generated and sent when performed on the local machine, the source of the instant card issuance application may also be the source of the PIN request in this context. The source of the PIN request may be verified against one or more predetermined trusted sources such that only requests from trusted sources are processed by the bridge application. For instance, the source may be identified by a domain name, Internet protocol address, certificate, or other identifying data of a card services provider that provides the remotely-served instant card issuance application. As such, the bridge application may provide security through address particularity and source particularity in connection with processing a PIN request.

If and when the bridge application receives a PIN request via the loopback address that has been generated by a source that is identified as a trusted source, the bridge application may further facilitate communication with the peripheral PIN entry device, thus providing bridged interaction between the instant card issuance application and the peripheral PIN entry device. In an embodiment, this bridged interaction by the bridge application may include passing the PIN request received from the browser application to a device driver of the local machine that defines interaction with the peripheral PIN entry device. In an alternate embodiment, the bridge application may, in response to receipt of a valid PIN request, generate an appropriate machine-domain message (e.g., system call) to a device driver or the like to interact with the peripheral device. That is, the bridge application may perform translation of the PIN request from Internet-domain messaging to machine-domain messaging. In either regard, it may be appreciated that the bridge application, by virtue of executing directly on the local device, may access hardware resources of the local device for direct interaction therewith. As such, the bridge application may provide bridged interaction between the remotely-served instant card issuance application and the peripheral PIN entry device by processing PIN requests received via Internet-domain messaging (e.g., Internet protocol messages) and in turn making appropriate calls to the peripheral PIN entry device.

The bridge application may also receive PIN data from the peripheral PIN entry device (e.g., in response to the PIN request). As will be discussed in greater detail below, the PIN data may comprise encrypted data corresponding to the customer-selected PIN. That is, the actual cleartext corresponding to the customer selected PIN data may not be received at the bridge application as the PIN data may be used to generate cyphertext, among other potential encrypted data, included in the PIN data.

The bridge application may further process the PIN data generated by the peripheral PIN entry device to generate Internet-domain messages containing the PIN data. These Internet-domain messages may be returned to the instant card issuance application, e.g., in response to the PIN request issued by the browser application. Again, the bridge application may receive the PIN data from the peripheral PIN entry device using machine-domain messaging and thereafter provide the PIN data to the browser application using Internet-domain messaging. As such, the bridge application may facilitate translation of the PIN data received from the peripheral PIN entry device as machine-domain messaging to Internet-domain messaging for communication to the instant card issuance application.

Accordingly, the bridge application may facilitate bridged communication via the loopback address of the local machine to provide interoperability between a remotely-served instant card issuance application and a local peripheral device. Because prior approaches to direct peripheral device interaction such as those that use directed access through native browser capabilities or browser plug-ins have been obsolesced, the approach described herein provides a solution that relies on standard Internet-domain to address a bridge application executing on a local machine that may in turn provide machine-domain messages for facilitating interaction with peripheral hardware operatively connected to the local machine. This solution provides a viable communication solution that changes the manner of communication between a remotely-served application performed on the local machine and the peripheral device operatively connected to the local machine from direct communication to bridged communication or bridged interaction that involves the bridge application. Rather than relying on obsolescent browser technologies, the solution provided herein leverages Internet-domain and machine-domain communication protocols and provides security measures to avoid unscrupulous access to peripheral devices in operative communication with the local machine by remotely served applications. This may allow for continued use of browser applications and/or other means for accessing the remotely-served instant cards issuance application such that interoperability with peripheral devices is maintained. As such, the SaaS model for provision of the instant card issuance application may be maintained such that the flexibility benefits provided to the client-side operation may be maintained including flexibility of platforms, low operational overhead requirements, and reliable security.

A first aspect includes a method for communication of data corresponding to a customer-selected PIN from a peripheral PIN entry device to a remotely-served instant card issue application. The method includes executing a bridge application on a local machine with which a peripheral PIN entry device is in operative communication. The method also includes exposing an application programming interface (API) of the bridge application for receipt of PIN requests only on a loopback address of the local machine on which the bridge application is executed. The method includes receiving a PIN request addressed to the loopback address at the bridge application from a remotely-served instant card issuance application. The PIN request identifies a source of the PIN request corresponding to the remotely-served instant card issuance application, and the method includes verifying the source of the PIN request as a trusted source. The method also includes communicating the PIN request between the bridge application and the peripheral PIN entry device using a device driver on the local machine to acquire PIN data from the peripheral PIN entry device corresponding to a customer-selected PIN entered at the peripheral PIN entry device. The method also includes returning the PIN data to the remotely-served instant card issuance application.

A number of feature refinements and additional features are applicable to the first aspect. These feature refinements and additional features may be used individually or in any combination. As such, each of the following features that will be discussed may be, but are not required to be, used with any other feature or combination of features of the first aspect.

For instance, in an embodiment, the PIN request may comprise a hypertext transfer protocol (HTTP) request. The PIN request may be communicated using a cryptographic communication protocol. As such, the PIN request may be communicated using standard methods of securing HTTP messages such as the SSL/TLS protocol.

The source associated with the PIN request may be a card services provider remote from the local machine. In relation to the card service provider, the method may also include requesting the remotely-served instant card issuance application from the card services provider. In turn, the method may also include receiving the remotely-served instant card issuance application from the card services provider. Further still, the method may include communicating customer information corresponding to a card to be processed by the card services provider (e.g., in connection with an instant card issuance solution provided by the card services provider). The method may include generating, at the card services provider, the remotely-served instant card issuance application.

In an embodiment, the PIN request may be generated by a browser application executing on the local machine and performing the remotely-served instant card issuance application. The remotely-served instant card issuance application may comprise a browser-based system user interface generated by a web service of the card services provider. The remotely-served instant card issuance application may include instructions for generation of the PIN request. In an embodiment, the remotely-served instant card issuance application may be generated by a web service of a card services provider. The remotely-served instant card issuance application may alternatively be performed by an integrated banking application executing on the local machine by accessing a web API of the web service of the card services provider. In an embodiment, the PIN request may be generated in response to selection of a customer-selected PIN option in the remotely serviced instant card issuance application for association with a card to be processed by the remotely-served instant card issuance application.

As a security measure, the verifying may include comparing the source of the PIN request to at least one predetermined trusted source. As such, the at least one predetermined trusted source may include a card services provider corresponding to the remotely-served instant card issuance application. The response may be provided to the card services provider corresponding to the remotely-served instant card issuance application. In this regard, the response may be used at the card services provider in connection with an instant issuance solution for instant issuance of a card. Accordingly, the method may further include steps associated with the issuance of a card, such as receiving, at a location associated with the local machine, a card generation command from the card services provider corresponding to the remotely-served instant card issuance application. The card generation command may include customer information and may be associated with the PIN data. As such, the method may include generating the card (e.g., at a card printer at the location associated with the local machine) in response to receiving the card generation command. As an example, the generating may include printing the card using the card printer. Additionally, the customer information may include a customer selected image such that the printing may include printing the customer selected image on the card. Also, the generating may include encoding at least some of the customer information onto the card.

As described above, the method may be associated with an instant card issuance solution. Each step of the method may be performed while the customer is present at the location associated with the local machine (e.g., a branch bank location). The method may be performed in connection with issuance of a card in a relatively short duration such as within 30 minutes, within 10 minutes, or even within 5 minutes or less. The present disclosure may assist in facilitating instant issuance in the time a customer may wait at a bank branch or the like to receive a card.

In an embodiment, the PIN request may include an encrypted PIN request. The PIN data returned by the peripheral PIN entry device may also include encrypted PIN data. The encrypted PIN data may include an encrypted PIN block generated by the peripheral PIN entry device in response to, and corresponding to, the customer-selected PIN entered by the customer at the peripheral PIN entry device. The encrypted PIN data may include a PIN cryptogram comprising the customer-selected PIN encrypted using an encryption key unique to the peripheral PIN entry device and a key serial number comprising a unique value corresponding to the encrypted PIN block associated with the PIN request and the peripheral PIN entry device.

A second aspect includes a system for interface between a remotely-served instant card issuance application and a peripheral PIN entry device at a local machine for customer-selected PIN entry in connection with the remotely serviced instant card issuance application. The system includes a local machine and a peripheral PIN entry device for generation of PIN data corresponding to a customer-selected PIN entered by a customer. The peripheral PIN entry device is in operative communication with the local machine via a device driver executed on the local machine. The system also includes a remotely-served instant card issuance application performed on the local machine and operative to generate a PIN request. The PIN request identifies a source of the PIN request corresponding to the remotely-served instant card issuance application. A bridge application is provided in the system that executes on the local machine. The bridge application exposes an API for receipt of the PIN request only on at a loopback address of the local machine. The bridge application only authorizes requests received on the loopback address from a trusted source for interface with the peripheral PIN entry device to retrieve the PIN data from the peripheral PIN entry device for return of the PIN data to the remotely-served instant card issuance application.

A number of feature refinements and additional features are applicable to the second aspect. These feature refinements and additional features may be used individually or in any combination. As such, each of the following features that will be discussed may be, but are not required to be, used with any other feature or combination of features of the second aspect.

For instance, the PIN request may include a hypertext transfer protocol (HTTP) request. The PIN request may be communicated using a cryptographic communication protocol such as SSL/TLS.

The system may also include a card services provider remote from the local machine. The card services provider may generate the remotely-served instant card issuance application. In an embodiment, the system may also include a browser application executing on the local machine. The remotely-served instant card issuance application may be performed by the browser application. As such, the remotely-served instant card issuance application may include a browser-based system user interface generated by a web service of the card services provider. In an embodiment, the remotely-served instant card issuance application may be generated by a web service of a card services provider. Additionally or alternatively, the system may include an integrated banking application executing on the local machine such that the remotely-served instant card issuance application may be performed by the integrated banking application by accessing a web API of the web service of the card services provider. In an embodiment, the trusted source may include a card services provider corresponding to the remotely-served instant card issuance application.

The system may also include a card printer at a location associated with the local machine. The card printer may receive a card generation command from the card services provider corresponding to the remotely-served instant card issuance application. The card generation command may include customer information and may be associated with the PIN data. The card printer may generate the card based on the card generation command. In connection therewith, the card printer may encode at least a portion of the customer information onto the card.

In an embodiment, the PIN request may include an encrypted PIN request. The PIN data may include encrypted PIN data. The encrypted PIN data may include an encrypted PIN block generated by the peripheral PIN entry device in response to, and corresponding to, the customer-selected PIN entered by the customer at the peripheral PIN entry device. The encrypted PIN data may include a PIN cryptogram comprising the customer-selected PIN encrypted using an encryption key unique to the peripheral PIN entry device and a key serial number comprising a unique value corresponding to the encrypted PIN block associated with the PIN request and the peripheral PIN entry device.

BRIEF DESCRIPTION OF THE FIGURES

FIG. 4 is a schematic diagram showing message flow between an Internet-domain and a machine domain of an embodiment of a system described herein.

DETAILED DESCRIPTION

Figure 1:
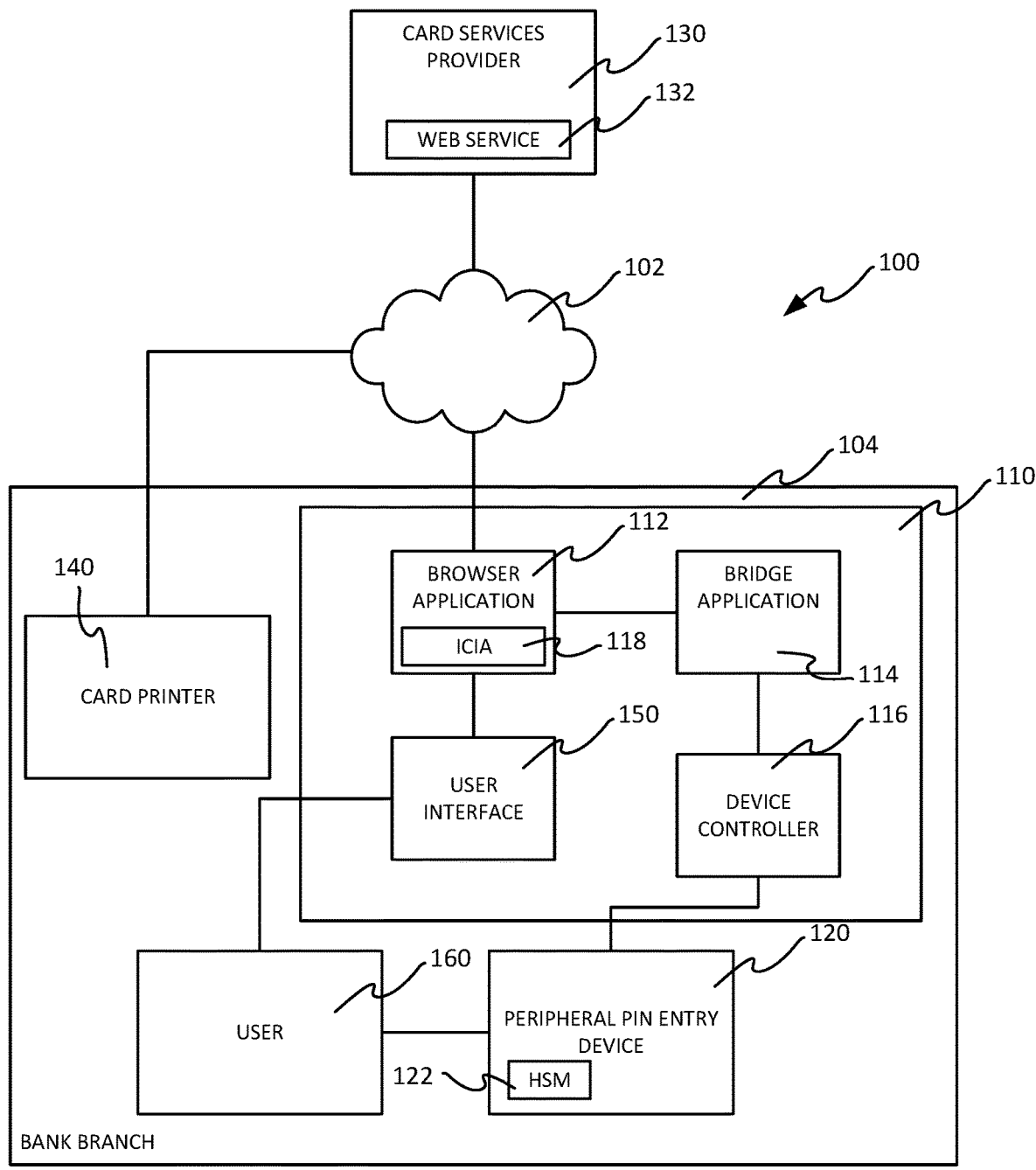
FIG. 1 depicts an embodiment of a system for bridged interaction between a remotely-served instant card issuance application and a peripheral PIN entry device that utilizes a bridge application.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

FIG. 1 depicts an embodiment of a system 100 that may facilitate interoperability between a remotely-served instant card issuance application 118 and a peripheral device operatively connected to a local machine 110. Specifically, the system 100 may provide bridged interaction at the local machine 110 between the remotely-served instant card issuance application 118 and the peripheral device 120 via a bridge application 114. The system 100 may provide functional interoperability between the remotely-served instant card issuance application 118 and the peripheral device 120 that provides a viable solution in view of the obsolescence of direct hardware access by browser applications.

The local machine 110 may execute a browser application 112 that is operable to perform the remotely-served instant card issuance application 118 that is served from a card services provider 130 located remotely from the local machine 110. As is described in greater detail below, the remotely-served instant card issuance application 118 may comprise an application that is accessed via a web service 132 of the card services provider 130 such that the functionality associated with the remotely-served instant card issuance application 118 is defined by code provided by card services provider 130 that is performed locally utilizing the browser application 112.

The local machine 110 may also include a user interface 150. User interface may include one or more input devices (e.g., keyboard, mouse, touchscreen, or other appropriate input device) and display devices to facilitate interaction between a user 160 and the local machine 110. In addition, the local machine 110 may be in operative communication with a peripheral PIN entry device 120 by way of a device controller 116.

As may be appreciated, various components of the system 100 (e.g., the browser application 112, bridge application 114, or other applications, modules, or components of the local machine 110) may comprise non-transitory computer readable data comprising computer readable program code stored in a memory of the local machine 110. The program code may include instructions for execution by a processor of the local machine 110 that is operable to access and execute the code. As such, upon execution of the processor according to the computer readable program code, any or all of the functionality described below with respect to corresponding ones of the components described herein may be provided.

The local machine 110 may be located at a given location such as a branch location 104 of a banking institution (i.e., a bank branch). The local machine 110 may be in operative communication with a card services provider 130. The card services provider 130 may be remote from the local machine 110 such that the local machine 110 may be in operative communication with the card services provider 130 by way of a wide area network 102 such as the Internet. The card services provider 130 may host an instant card issuance application 118 that is accessible by operative communication with the card services provider 130. For instance, the instant card issuance application 118 may be a hosted web service 132 of the card services provider 130 that is accessed by way communication over the wide area network 102 using Internet-domain messages (e.g., TCP/IP protocol). In this regard, the instant card issuance application 118 may be remotely-served by the card services provider 130 to the local machine 110 by exchanging Internet-domain messages (e.g., HTTP requests and responses) between the web service 132 of the card services provider 130 and the local machine 110. Accordingly, while the instant card issuance application 118 may be performed by the browser application 112, the code or instructions defining the instant card issuance application 118 may be provided by the web service 132. In turn, the functionality of the instant card issuance application 118 may rely on exchange of messages (e.g., utilizing Internet protocol messages) between the local machine 110 and the web service 132.

In response to communication between the local machine 110 to the web service 132 (e.g., using an API provided for communication with the web service 132), the instant card issuance application 118 may be provided to the local machine 110 for performance of at least a portion of the instant card issuance application 118 on the browser application 112 of the local machine 110. For instance, the instant card issuance application 118 may comprise Internet protocol messages (e.g., HTTP messages comprising requests and responses) that are sent between the browser application 112 and the web service 132 for performance of portions of the instant card issuance application 118 by the browser application 112. In an embodiment, the browser application 112 may render and present to a user a user interface based on instructions received from the web service 132 for receipt of information from a user.

In this regard, the instant card issuance application 118 may be initiated by user 160 issuing a command by way of the user interface 150 for the browser application 112 to access the web service 132 of the card services provider 130. For example, this may include entering a specific URL or IP address to which the browser application 112 may be directed. In turn, messages may be exchanged between the browser application 112 and the web service 132. Such messages may facilitate authentication of the user 160 to the card services provider 130 such as by way of input of a username and password, two factor authentication, or other authentication method.

Once the user 160 has been authenticated to the card services provider 130, the browser application 112 and the web service 132 may exchange messages to facilitate performance of the instant card issuance application 118 at the local machine 110. This may include serving commands from the web service 132 to the browser application 112 that define user interface elements for configuration of the user interface 150 presented to the user 160. For example, such user interface elements may comprise requests for information that provide input fields into which data may be provided by the user 160 using the user interface 150. For instance, these data fields may be utilized to gather customer information that is returned from the browser application 112 to the web service 132 utilizing response messages. In an embodiment, the instant card issuance application 118 may include sequential user prompts that guide a user 160 through a process defined by the sequential user prompts of the instant card issuance application 118 to gather information required for issuance and/or personalization of a card in connection with an instant card issuance solution offered by the card services provider. Further processing of the information provided by the browser application 112 to the web service 132 in connection with the performance of the instant card issuance application 118 may be further processed by the card services provider 130, such as in processes utilized for personalization of cards to be issued to the user by the instant issuance solution.

As addressed above, it may be advantageous to allow the user 160 to provide a customer-specified PIN for use in connection with a card to be issued at the location 104. As such, the instant card issuance application 118 may include an option (e.g., defined by the logic of the instant card issuance application 118 provided by the web service 132) that is selectable by the user 160 to indicate a customer-specified PIN is desired. In response to the selection of the option by the user 160 that indicates a customer-selected PIN is desired, the web service 132 may provide instructions for the instant card issuance application 118 that result in the generation of a PIN request to be addressed to the bridge application 114 as described in greater detail below. As may be appreciated, the selection of the option for a customer-specified PIN in the instant card issuance application 118 may trigger the generation and sending of the PIN request described in greater detail below.

Figure 2:
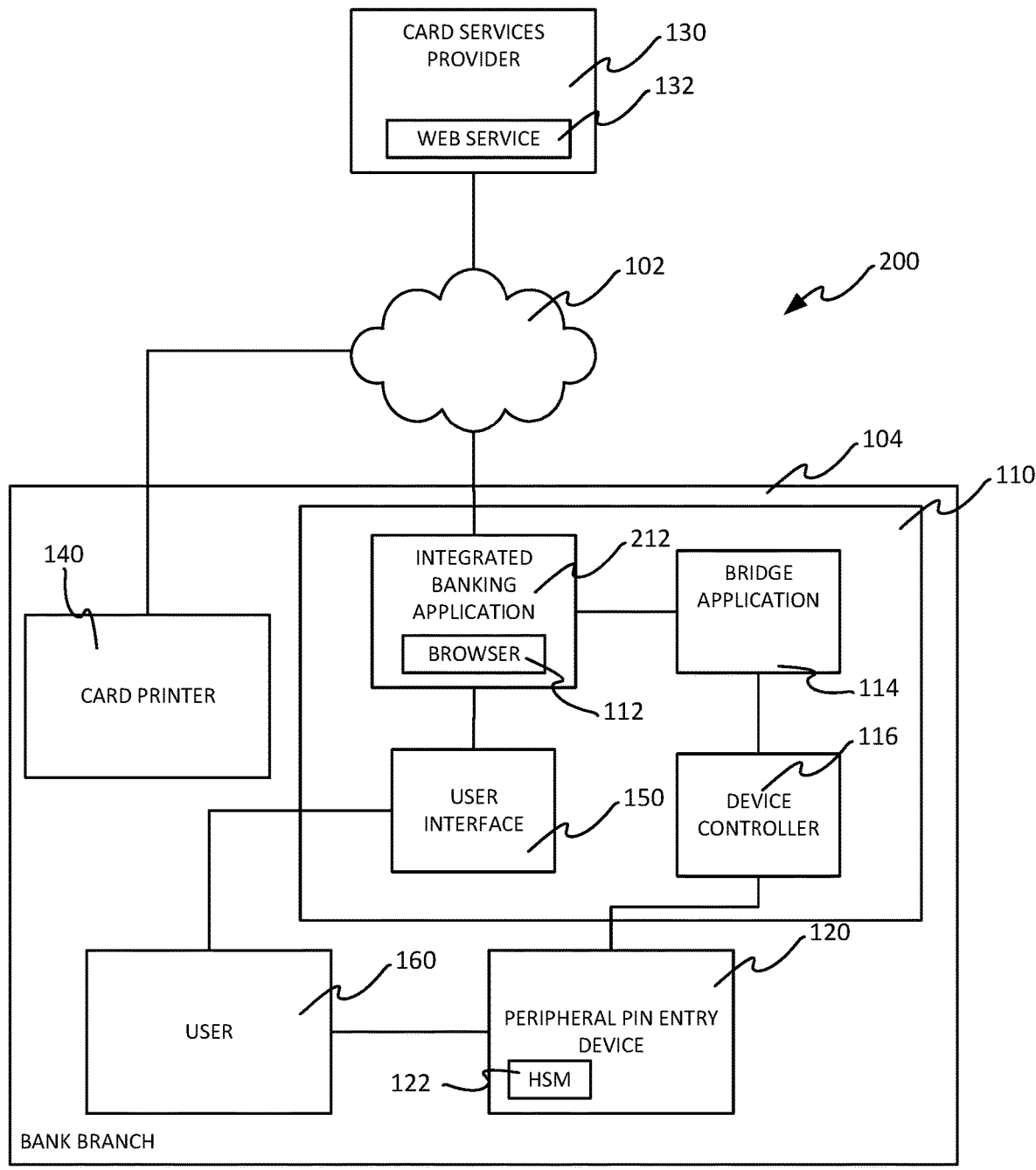
FIG. 2 depicts another embodiment of a system for bridged interaction between a remotely-served instant card issuance application and a peripheral PIN entry device that utilizes a bridge application and includes an integrated banking application executing on the local machine.

In an alternative embodiment of a system 200 shown in FIG. 2, the local machine 110 may comprise an integrated banking application 212 executing on the local machine 110. That is, a bank or other entity operating the local machine 110 may implement a banking application 212 that is executable at a local machine 110 (e.g., at a branch 104 of the bank). In turn, customer information and/or banking data may be hosted in the integrated banking application 212.

However, the integrated banking application 212 may rely on the remotely-served instant card issuance application 118 for facilitating instant issuance of cards within the bank branch 104. In this regard, the integrated banking application 212 may still access the web service 132 of the card services provider 130 using HTTP requests in a manner identical to the browser application 112. For instance, the integrated banking application 212 may comprise a browser application 112 for communication of HTTP messages with the web service 132 of the card services provider 130 via the API that defines the manner of communication with the web service 132. As such, the browser application 112 or the integrated banking application 212 may format requests and responses in an identical manner for interaction with the web service of the card services provider 130. However, other aspects, such as the user interface elements resulting from the instant card issuance application 118, may differ between an integrated banking application 212 and use of the browser application 112 for performing the instant card issuance application 118. However, the sequential user prompts may still be defined by the web service 132 in relation to performance of the instant card issuance application 118. In this regard, the integrated banking application 212 may simply provide an alternative platform on which the instant card issuance application 118 may be performed, however the performance of the instant card issuance application 118 may be identical to, and driven by, the same messages received from the web service 132 as was the case in the system 100.

In regard to either embodiment of the system 100 or 200, as the instant card issuance application 118 may not be required to be downloaded and installed for local execution at the local machine 110, the instant card issuance application 118 may be a remotely-served application that is provided by the card services provider 130. In this regard, the web service 132 of the card services provider 130 may facilitate a web-based SaaS solution for provision of the instant card issuance application 118 with the attendant benefits thereof. For instance, the required overhead resources at the local machine 110 may be minimized. That is, the local machine 110 may only include a commonly available browser application 112 capable of communicating Internet protocol messages (e.g., HTTP messages) with the card services provider 130. In turn, the platform (e.g., operating system or hardware) of the local machine 110 may be immaterial to the execution of the instant card issuance application 118. As such, the remotely-served instant card issuance application 118 may be executed on any platform providing flexibility to the bank branch 104.

Browser applications 112 and Internet protocol communication methodologies associated therewith are ubiquitous in modern computing. As such, the requirement to install and/or maintain local software to provide functionality associated with an instant card issuance application 118 may be minimized and the operator of the local machine 110 (e.g., a local bank branch 104 or the like) may not be tasked with the installation, updating, and other maintenance of the instant card issuance application 118. This may allow for increased flexibility with respect to the instant card issuance application 118. In this regard, providing an instant card issuance application 118 as a remotely-served application for performance at a browser 112 at the local machine 110 may alleviate a number of complications and facilitate an efficient and easy-to-implement solution. Moreover, the attendant benefits of SaaS software such as, for example, advantages in relation to distribution, pricing, and architecture of SaaS software may be realized.

While the bridge application 114 represents a locally executing application with functionality provided natively without interaction with the web service 132, the installation and execution of the bridge application 114 may be a single-occurrence event that does not limit the foregoing benefits of the remotely-served instant card issuance application 118. As the entity that operates the local machine 110 at the bank branch 104 in which the instant card issuance application 118 is to be provided (e.g., the banking institution) may have an existing relationship with the card services provider 130, the bridge application 114 may be provided with a single installation event that may be coordinated by the card services provider 130. Thereafter, the bridge application 114 may facilitate bridged interaction as described in greater detail below without requiring installation and/or configuration of each instance of the instant card issuance application 118.

Moreover, as the functions of the instant card issuance application 118 may be provided by the web service 132 of the card services provider 130, modifications to the instant card issuance application 118 may be provided without affecting the bridge application 114. That is, so long as the bridge application 114 is operated in the manner as described below, the functionality for access to the local device controller 116 may be provided. In this regard, the bridge application 114 may be used to facilitate access to any peripheral device. Moreover, the bridge application 114 may be used in contexts other than an instant card issuance application 118 to facilitate interoperability between a browser application 112 and local peripheral hardware.

As described briefly above, a number of difficulties are presented in relation to direct interface of a remotely-served application performed on a local machine 110 with peripheral devices (e.g., the peripheral PIN entry device 120) in operative communication with the local machine 110. Specifically, traditional approaches to facilitating the interface with a hardware device connected to a local machine 110 included execution of client-side scripting that was performed at the local machine 110 for direct interaction with the device drivers and other hardware of the local machine 110. That is, traditional approaches included utilization of browser resources manipulated by client-side scripting provided by an application provider to allow for direct manipulation of local machine resources. Examples of such client-side scripting included utilization of JavaScript® or implementing ActiveX controls. These tools one performed as native functions of a web browser or one provided by plug-ins executed by the browser. In any regard, the browser in such contexts accesses hardware resources of the local machine directly, e.g., to facilitate interface with peripheral devices.

However, these approaches present difficulty in relation to platform specific requirements, plug-in requirements for various different implementations, and security concerns. As result, support for such tools, including native support and plug-in support, in many modern browsers is not provided such that these approaches, in addition to their noted drawbacks, are simply not available for utilization in connection with remotely-served applications performed on a local machine when using common modern web browsers. That is, the traditional approach of native hardware access has been made obsolescent in most common browsers. Moreover, many browsers do not allow execution of plug-ins that facilitate direct hardware access by applications performed by the browser. As a result, a web service provider, such as a card services provider 130, faces a difficulty in maintaining a remotely-served instant card issuance application 118 while facilitating interaction with peripheral devices to be used in connection with the instant card issuance application 118.

Use of such peripheral devices may be of particular importance in the context of instant card issuance. Namely, the ability for a customer to define his or her own PIN in connection with the card to be instantly issued is an advantageous feature that provides convenience for both the customer and card issuer. Specifically, the customer is not tasked with having to remember a PIN provided by the card services provider 130, and the customer is also not required to perform a PIN change operation after receipt of their card. In addition, the card issuer or card services provider 132 has to facilitate fewer PIN change operations and may realize increased card activations by providing the convenience of a customer-specified PIN for instant card issuances. In turn, the provision of a customer-selected PIN may be advantageously facilitated by peripheral PIN entry devices 120.

The peripheral PIN entry device 120 may have a hardware security module (HSM) 122. The HSM 122 may comprise encryption keys used for generating PIN data that may be encrypted to allow for secure transmission and storage of PIN data. The provision of the HSM 112 at the peripheral PIN entry device 120 reduces the risk associated with unencrypted PIN data as the PIN is encrypted at the point of entry by the customer. Also, provision of the HSM in the peripheral device allows for physical control over the device and, in particular, key management for the peripheral PIN entry device 120. Such key management, physical security, and encryption requirements may be at least in part derived from industry standards such as Payment Card Industry (PCI) standards. In turn, use of a peripheral PIN entry device 120 provides security features that are difficult to replicate while complying with industry security standards using, for example, software executing on the local machine 110 for receipt of a PIN entered by the customer.

As such, it is important to maintain interoperability between a remotely-served instant card issuance application 118 and a peripheral PIN entry device 120. However, in view of the elimination of support of traditional approaches to this interaction in browsers and the like, an alternative manner of operation of the local machine 110 must be provided to facilitate continued interactivity between the instant card issuance application 118 and the peripheral PIN entry device 120.

Accordingly, in the embodiment of the system 100, the bridge application 114 may be provided. Specifically, the bridge application 114 may be a locally executing application such as a Windows® service, UNIX daemon, or other background program executing on the local machine 110. Specifically, the bridge application 114 may define an API that may be used to communicate with the bridge application 114 as if the bridge application 114 were a web service that is executing locally on the local machine 110. The bridge application 114 may expose the API for communication with the browser application 112 using standard Internet communication protocols such as TCP/IP through exchange of HTTP messages. That is, the bridge application 114 may expose the API to allow for communication with the browser application 112 by way of HTTP messages associated with the API of the bridge application 114. The browser application 112 may be operative to address HTTP requests to the bridge application 114 by addressing a loopback address of the local machine 110. In turn, in the context of the system 100, the HTTP request addressed to the bridge application 114 may be a PIN request for a request of PIN data from the peripheral PIN entry device 120.

The loopback address may be an Internet Protocol Suite address used to address network packets to the local machine 110 such that the packets addressed to the loopback address bypass any network interface components of the local machine 110. In most contexts, the IPv4 address 127.0.0.1 is reserved for the loopback address, and the IPv6 address ::1 is reserved as a loopback address. In any regard, packets addressed to the loopback address may bypass any network interface and may be directly routed to the local machine 110 without traversing any network external to the local device 110. In turn, the bridge application 114 may expose the API for receipt of a PIN request from the browser application 112 on the loopback address. All communication between the browser application 112 and the bridge application 114 may use the TCP/IP protocol even though the communication occurs entirely within the local machine 110. As the communication between the instant card issuance application 118 and the bridge application 114 may be provided via the standard TCP/IP protocol, the communication may be encrypted using SSL/TLS or other security standards for Internet communication.

The bridge application 114 may also provide security as the bridge application 114 may be configured to only receive PIN requests on the loopback address of the local machine 110 on which the bridge application 114 is executed. Accordingly, any PIN requests received that have been addressed to any IP address other than the loopback address (e.g., the IP address of the local machine as exposed to an external network) may be ignored by the bridge application 114 such that the PIN requests are not directed to the bridge application 114 and/or are not processed by the bridge application 114. As the loopback address may only be addressed from the local machine 110, the address particularity of the bridge application 114 may prevent processing of PIN requests that originate externally to the local machine 110. That is, if a PIN request that originates externally to the local machine 110 is addressed to the bridge application 114, it would have to be addressed to the bridge application 114 using an IP address other than the loopback address. By serving PIN request only on the loopback address, the bridge application 112 provides a level of security to ensure only PIN requests from the local machine 110 are served.

Moreover, an additional level of security may also be provided by the bridge application 114 by verifying a source of the PIN request prior to processing the request. That is, PIN requests may be verified to determine that the source of the PIN request corresponds to a trusted source prior to processing a PIN request at the bridge application 114. In this regard, the bridge application 114 may be operative to receive a PIN request addressed to the loopback address and determine the source of the PIN request. For example, the source of the PIN request may indicate a domain, URL, IP address, certificate, or other identifying indicia associated with the source of the PIN request. As may be appreciated, the source of the PIN request may correspond to the source of the instant card issuance application 118 such that the identifying data may pass through from the instant card issuance application 118 to the PIN request provided to the bridge application 114. For instance, when a user 160 directs the browser application 112 to the web service 132 of the card services provider 130, the identity of the card services provider 130 may be returned along with the data associated with the instant card issuance application 118. The instant card issuance application 118 provided by the card services provider 130 may also include instructions for the browser application 112 to send a PIN request to the bridge application 114 at the loopback address. Upon generation of this PIN request addressed to the bridge application 114, the identity of the card services provider 130 (i.e., the provider of the instant card issuance application 118 that includes instructions to generate the PIN request using the browser application 112) may also be associated with the PIN request. That is, the identity of the provider of the instant card issuance application 118 may flow through to the bridge application 114.

In any regard, the source of the PIN request may be compared to a predetermined one or more trusted sources. The predetermined one or more sources may be stored in memory accessible by the bridge application 114. The predetermined one or more sources may correspond exclusively to the card services provider 130, which may also provide the bridge application 114 for installation at the local machine 110. In the event that the PIN request is not associated with a trusted source, the bridge application 114 may disregard the PIN request. In contrast, if the source of the PIN request corresponds to a trusted source, bridge application 114 may process the PIN request. In turn, the bridge application 114 may identify the source of the PIN request to only process PIN requests from trusted sources received on the loopback address.

The bridge application 114 may execute on the local machine 110. In turn, the bridge application 114 may be operative to interface with the device controller 116 of the local machine 110 for use in direct interaction with a peripheral device 120 connected to the local machine 110 using machine-domain messaging. For instance, in the case of a peripheral PIN entry device 120, the peripheral PIN entry device 120 may be in operative communication with the local machine 110 by way of a standard hardware interface such as a USB connection or the like. In turn, the bridge application 114 may interact with the device controller 116 to communicate with the peripheral PIN entry device 120 using the machine-domain messaging. The machine-domain messaging may include system calls that are formatted for interaction with components of the local machine 110. Such system calls may be defined by the operating system of the local machine 110 and may include, for example, APIs, application binary interfaces (ABIs), or other protocols or messaging that facilitates direct interaction with hardware associated with the local machine 110.

With further reference to FIG. 4, a schematic view 400 is presented that illustrates the relative approaches to messaging performed by an embodiment of a system described herein. Specifically, FIG. 4 includes an Internet-domain region 410 and a machine-domain region 450. As may be appreciated, the machine-domain region 450 may include components within the local machine in an onboard portion 452 as well as peripheral components in a peripheral portion 454. As will be described in greater detail below, both the onboard portion 452 as well as the peripheral portion 454 may comprise the machine-domain region 450 such that messaging performed within either one of these portions may include machine-domain messages.

Interaction between components within the Internet-domain region 410 may be facilitated by way of Internet-domain messaging. As described above, this may include utilization of Internet protocol messaging such as the TCP/IP protocol. Specifically, communication between the card services provider 130 in the browser application 112 may utilize Internet-domain messaging.

Furthermore, interaction between components within the machine-domain region 450 may be facilitated by way of machine-domain messaging. As described above, this may include utilization of standard computer hardware messaging protocols such as APIs and/or ABIs that may include system calls or other operating system specific messaging. In this regard, communication between the device controller 116 and peripheral PIN entry device 120 may be facilitated by way of machine-domain messaging.

Further still, the bridge application 114 may be positioned at interface between the Internet-domain region 410 the machine-domain region 450. The bridge application 114 may communicate with browser application 112 in the Internet-domain region 410 using Internet-domain messaging. However, the bridge application 114 may communicate with the device controller 116 utilizing machine-domain messaging. As such, in at least some embodiments, the bridge application 114 may facilitate translation of Internet-domain messaging to machine-domain messaging in connection with processing of a PIN request. That is, the bridge application 114 may receive an Internet-domain message corresponding to the PIN request from the browser application 112 performing the instant card issuance application 118. The bridge application 114 may generate a machine-domain message corresponding to the PIN request for communication of the PIN requests in a machine-domain message to the device controller 116. Likewise, the bridge application 114 may receive a machine-domain message corresponding to PIN data from the peripheral PIN entry device 120 via the device controller 116. The bridge application 114 may generate Internet-domain messages that are sent to the browser application 112 for inclusion in the instant card issuance application 118 (e.g. including messages returned to the web service 132 of the card services provider 130).

Figure 3:
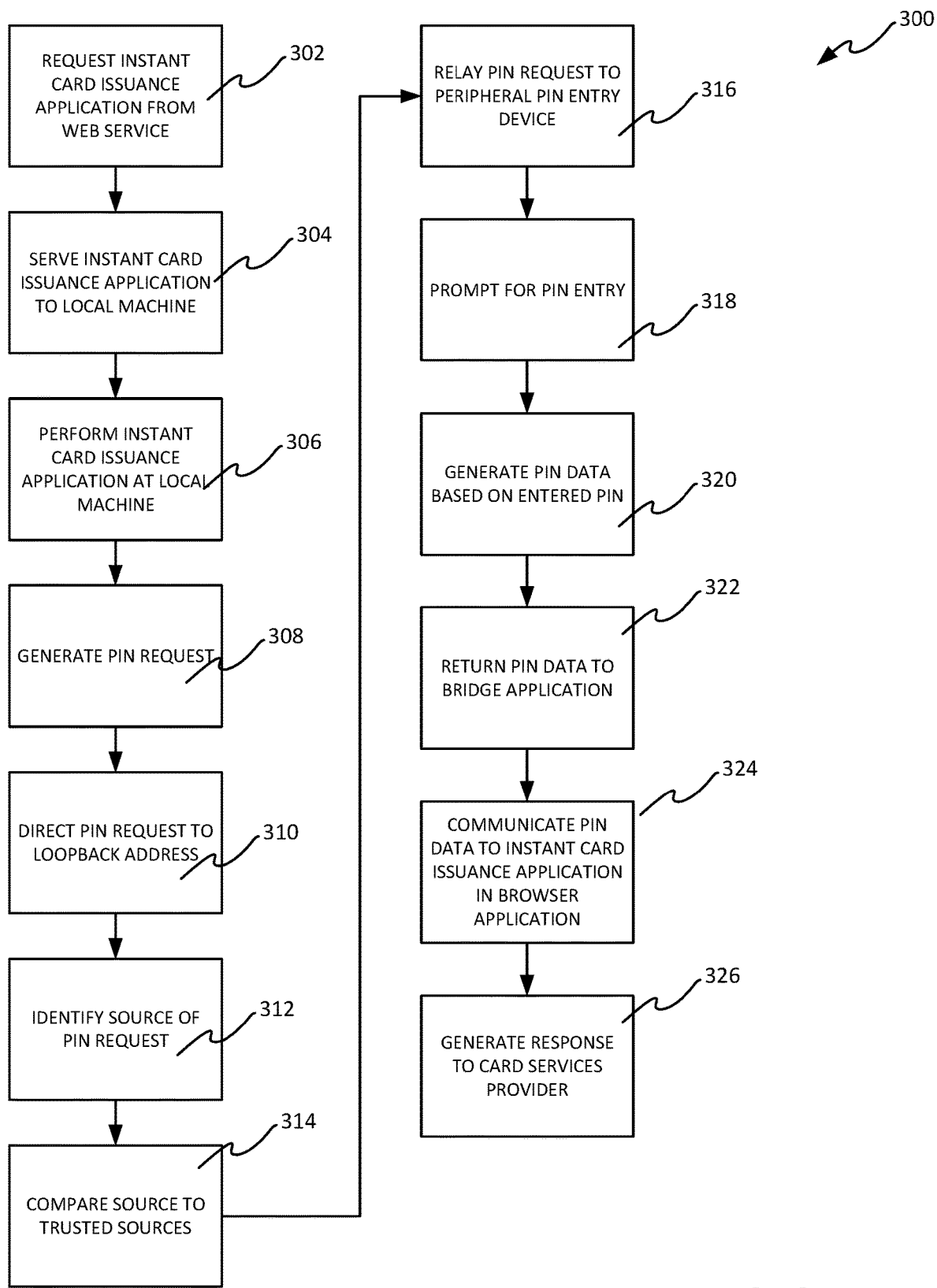
FIG. 3 depicts a flow chart of a method for operation of a local machine for bridged interaction between a remotely-served instant card issuance application and a peripheral device operatively connected to the local machine.

With further reference to FIG. 3, and embodiment of method 300 for operation of a system as described herein is depicted in as a flow chart. The method 300 may include requesting 302 a remotely-served instant card issuance application 118 from the web service 132. As described above, this request may be in the form of standard TCP/IP messaging such as HTTP requests and responses. In any regard, the instant issuance application 118 may include be served 304 by the card services provider 130 such that the instant card issuance application 118 is performed 306 in the browser application 112 on the local machine 110. The instant card issuance application 118 may include instructions to generate 308 a PIN request that is directed 310 to the loopback address of the local machine 110. In addition, the PIN request may include an identification of the source of the PIN request corresponding to the source of the remotely-served instant card issuance application 118 (e.g., the card services provider 130).

When the bridge application 114 receives a PIN request at the loopback address of the local machine 110, the bridge application 114 may identify 312 the source of the PIN request. In turn, the source of the PIN request may be compared 314 to one or more trusted sources. If the source is determined to be a trusted source, the bridge application 114 may relay 316 the PIN request to the peripheral PIN entry device 120 by way of the device controller 116. In turn, the peripheral PIN entry device 120 may prompt 318 a user to enter a customer-selected PIN. Entry of the PIN by the user may result in the peripheral PIN entry device 120 generating 320 PIN data that may be returned 322 to the bridge application 114 by way of the device controller 116. The PIN data is described in greater detail below. In turn, the bridge application 114 may communicate 324 the PIN data to the browser application 112. Again, the communication between the bridge application 114 the browser application 112 may take the form of HTTP messages.

In this regard, the bridge application 114 may act as a web service executing locally on the local machine 110 that is addressable by the browser application 112 at the loopback address of the local machine 110. When the PIN data is communicated 324 to the browser application 112, the PIN data may be incorporated by the instant card issuance application 118 for generating 326 a response to the card services provider 130. In turn, the PIN data corresponding to the customer-selected PIN entered at the peripheral PIN entry device 120 may be returned to the card service provider 130 further use in issuing a card.

The local machine 110 employing the bridge application 114 may, in turn, assist in facilitating instant issuance of a card to a customer at the bank branch 104 having a customer-selected PIN. That is, the customer may apply for, provide the PIN for, and receive, the issued and printed card within the same visit to a single location such as the bank branch 104 (e.g., within the span of about 30 minutes or less, 10 minutes or less, or even 5 minutes or less). Accordingly, the instant card issuance application 118 served by the web service 132 may provide instructions that, when performed, allow a user of the local machine 110 to provide information needed for issuance of a card. As such, the disclosure provided herein may be used in conjunction with an instant card issuance solution to provide customer-selected PIN information in connection with an instant issuance card. One such example of an instant issuance solution is described in U.S. Pat. No. 8,429,075, the entirety of which is incorporated by reference herein.

For example, customer data may be input into a user interface of the instant card issuance application 118 at the local machine 110. The user interface may be generated for display in the browser application 112 by the web service 132 of the card service provider 130.

In turn, the customer data provided may be returned to the web service 132 of the card service provider 130. The customer data may comprise the PIN data generated by the peripheral PIN entry device 120. Additionally, the customer data may comprise a custom image selected by and/or provided by the customer by way of the user interface of the instant card issuance application 118. Further still, the customer data may include the customer name, address information, a personal account number (PAN), personal identifying information (e.g., social security number or the like), income, financial information, or other data that may be relevant in card issuance. In at least some embodiments, communication between the local machine 110 and the card services provider 130 may be provided by a secure virtual private network (VPN) connection. In this regard, a secure, encrypted connection may be established for communication of data between the local machine 110 and the card services provider 130 by way of the wide area network 102.

Once the card services provider 130 receives the customer data, the card services provider 130 may process a card issue request from the local machine 110. This may include use of a HSM at the card services provider to generate card data such as security data (e.g., card verification value (CVV) or the like). Furthermore, encoded card data such as magnetic stripe information and/or EMV chip data may be retrieved and/or generated for the card. Moreover, the PIN data may be stored for later use, for example, in processing transactions using the card. In addition, card image data may be retrieved and utilized to generate card image data. The card image data may comprise customer data including, for example, the customer name, PAN, background image data, CVV data, card encoding data, or other information required for printing and/or encoding the card. In turn, the card image data may be used to generate a card print job. The card print job may be sent to a card printer 140 at the bank branch 104 as a card print command comprising the card print job.

The card printer 140 may comprise a security appliance that facilitates a persistent VPN connection with the card services provider 130 to receive the card print command. The security appliance may be a hardened Linux appliance functioning as a router, firewall, and dynamic-to-static IPSEC endpoint that complies with Center for Internet Security (CIS) standards. Accordingly, when the card printer 140 receives the card print command, the card printer 140 may print the card for issuance to the customer present at the bank branch 104. The card printer 140 may also be operative to be responsive to the card services provider 130 to provide a print confirmation and/or error data associated with errors encountered when printing the card. As shown in FIGS. 1, 2, and 4, the communication between the card services provider 130 and the card printer 140 may be direct (e.g., using the IPSEC endpoint). Accordingly, the card services provider 130 may issue the card print command from the Internet-domain region 410 to the machine-domain region 450. In this regard, the print command may comprise machine-domain messages contained within Internet-domain messages. For instance, the communications may be formatted as TCP/IP packets with a data payload containing the message-domain messages appropriate to cause the card printer 140 to print and personalize the card. As such, the printer (e.g., the Linux appliance) may be operative to receive the Internet-domain messages, extract the machine-domain messages and issue them to the printer for printing/personalization of the card.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for communication of data corresponding to a customer-selected personal identification number (PIN) from a peripheral PIN entry device to a remotely-served instant card issue application, the method comprising:
   executing a bridge application on a local machine with which a peripheral PIN entry device is in operative communication;
   exposing an application programming interface (API) of the bridge application for receipt of PIN requests only on a loopback address of the local machine on which the bridge application is executed;
   receiving a PIN request addressed to the loopback address at the bridge application from a remotely-served instant card issuance application, wherein the PIN request identifies a source of the PIN request corresponding to the remotely-served instant card issuance application;
   verifying the source of the PIN request as a trusted source;
   communicating the PIN request between the bridge application and the peripheral PIN entry device using a device driver on the local machine to acquire PIN data from the peripheral PIN entry device corresponding to a customer-selected PIN entered at the peripheral PIN entry device; and returning the PIN data to the remotely-served instant card issuance application.

2. The method of claim 1, wherein the PIN request comprises a hypertext transfer protocol (HTTP) request.

3. The method of claim 2, wherein the PIN request is communicated using a cryptographic communication protocol.

4. The method of claim 1, wherein the source comprises a card services provider remote from the local machine.

5. The method of claim 4, wherein the method further comprises:
   requesting the remotely-served instant card issuance application from the card services provider;
   receiving the remotely-served instant card issuance application from the card services provider; and
   communicating customer information corresponding to a card to be processed by the card services provider.

6. The method of claim 5, further comprising:
   generating, at the card services provider, the remotely-served instant card issuance application.

7. The method of claim 6, wherein the PIN request is generated by a browser application executing on the local machine and performing the remotely-served instant card issuance application, and wherein the remotely-served instant card issuance application comprises a browser-based system user interface generated by a web service of the card services provider.

8. The method of claim 1, wherein the remotely-served instant card issuance application comprises instructions for generation of the PIN request.

9. The method of claim 8, wherein the remotely-served instant card issuance application is generated by a web service of a card services provider.

10. The method of claim 9, wherein the remotely-served instant card issuance application is performed by a browser application executing on the local machine, and wherein the remotely-served instant card issuance application comprises a browser-based system user interface generated by the web service of the card services provider.

11. The method of claim 9, wherein the remotely-served instant card issuance application is performed by an integrated banking application executing on the local machine by accessing a web API of the web service of the card services provider.

12. The method of claim 1, wherein the PIN request is generated in response to selection of a customer-selected PIN option in the remotely serviced instant card issuance application for association with a card to be processed by the remotely-served instant card issuance application.

13. The method of claim 12, wherein the verifying comprises comparing the source of the PIN request to at least one predetermined trusted source.

14. The method of claim 13, wherein the at least one predetermined trusted source comprises a card services provider corresponding to the remotely-served instant card issuance application.

15. The method of claim 14, wherein the response is provided to the card services provider corresponding to the remotely-served instant card issuance application.

16. The method of claim 15, further comprising:
   receiving, at a location associated with the local machine, a card generation command from the card services provider corresponding to the remotely-served instant card issuance application, wherein the card generation command comprises customer information and is associated with the PIN data.

17. The method of claim 16, further comprising:
   generating the card, at a card printer at the location associated with the local machine, in response to receiving the card generation command.

18. The method of claim 17, wherein the generating comprises printing the card.

19. The method of claim 18, wherein the customer information comprises a customer selected image, and wherein the printing comprises printing the customer selected image on the card.

20. The method of claim 18, wherein the generating comprises encoding the customer information onto the card.

21. The method of claim 20, wherein each step of the method is performed while the customer is present at the location associated with the local machine.

22. The method of claim 1, wherein the PIN request comprises an encrypted PIN request.

23. The method of claim 22, wherein the PIN data comprises encrypted PIN data.

24. The method of claim 23, wherein the encrypted PIN data comprises an encrypted PIN block generated by the peripheral PIN entry device in response to, and corresponding to, the customer-selected PIN entered by the customer at the peripheral PIN entry device.

25. The method of claim 24, wherein the encrypted PIN data comprises:
   a PIN cryptogram comprising the customer-selected PIN encrypted using an encryption key unique to the peripheral PIN entry device, and
   a key serial number comprising a unique value corresponding to the encrypted PIN block associated with the PIN request and the peripheral PIN entry device.

26. A system for interface between a remotely-served instant card issuance application and a peripheral personal identification number (PIN) entry device at a local machine for customer-selected PIN entry in connection with the remotely serviced instant card issuance application, the system comprising:
   a local machine;
   a peripheral PIN entry device for generation of PIN data corresponding to a customer-selected PIN entered by a customer, the peripheral PIN entry device being in operative communication with the local machine via a device driver executed on the local machine;
   a remotely-served instant card issuance application performed on the local machine and operative to generate a PIN request, wherein the PIN request identifies a source of the PIN request corresponding to the remotely-served instant card issuance application;
   a bridge application executing on the local machine that exposes an application programming interface (API) for receipt of the PIN request only on at a loopback address of the local machine, wherein the bridge application only authorizes requests received on the loopback address from a trusted source for interface with the peripheral PIN entry device to retrieve the PIN data from the peripheral PIN entry device for return of the PIN data to the remotely-served instant card issuance application.

27. The system of claim 26, wherein the PIN request comprises a hypertext transfer protocol (HTTP) request.

28. The system of claim 27, wherein the PIN request is communicated using a cryptographic communication protocol.

29. The system of claim 26, further comprising:
   a card services provider remote from the local machine that generates the remotely-served instant card issuance application.

30. The system of claim 29, further comprising:
a browser application executing on the local machine, wherein the remotely-served instant card issuance application is performed by the browser application;
wherein the remotely-served instant card issuance application comprises a browser-based system user interface generated by a web service of the card services provider.

31. The system of claim 26, wherein the remotely-served instant card issuance application is generated by a web service of a card services provider.

32. The system of claim 31, further comprising:
a browser application executing on the local machine, wherein the remotely-served instant card issuance application is performed by the browser application; and
wherein the remotely-served instant card issuance application comprises a browser-based system user interface generated by a web service of the card services provider.

33. The system of claim 31, further comprising:
an integrated banking application executing on the local machine, wherein the remotely-served instant card issuance application is performed by the integrated banking application by accessing a web API of the web service of the card services provider.

34. The system of claim 26, wherein the trusted source comprises a card services provider corresponding to the remotely-served instant card issuance application.

35. The system of claim 34, further comprising:
a card printer at a location associated with the local machine, wherein the card printer receives a card generation command from the card services provider corresponding to the remotely-served instant card issuance application, wherein the card generation command comprises customer information and is associated with the PIN data.

36. The system of claim 35, wherein the card printer generates the card based on the card generation command.

37. The system of claim 36, wherein the card printer encodes at least a portion of the customer information onto the card.

38. The system of claim 26, wherein the PIN request comprises an encrypted PIN request.

39. The system of claim 38, wherein the PIN data comprises encrypted PIN data.

40. The system of claim 39, wherein the encrypted PIN data comprises an encrypted PIN block generated by the peripheral PIN entry device in response to, and corresponding to, the customer-selected PIN entered by the customer at the peripheral PIN entry device.

41. The system of claim 40, wherein the encrypted PIN data comprises:
a PIN cryptogram comprising the customer-selected PIN encrypted using an encryption key unique to the peripheral PIN entry device, and
a key serial number comprising a unique value corresponding to the encrypted PIN block associated with the PIN request and the peripheral PIN entry device.

* * * * *